United States Patent [19]

Koshimo

[11] Patent Number: 4,919,241
[45] Date of Patent: Apr. 24, 1990

[54] LOCKUP DAMPER FOR TORQUE CONVERTER

[75] Inventor: Masahiko Koshimo, Higashiosaka, Japan

[73] Assignee: Kabushiki Kaisha Daikin Seisakusho, Osaka, Japan

[21] Appl. No.: 246,824

[22] PCT Filed: Jan. 19, 1988

[86] PCT No.: PCT/JP88/00036

§ 371 Date: Sep. 9, 1988

§ 102(e) Date: Sep. 9, 1988

[87] PCT Pub. No.: WO88/05511

PCT Pub. Date: Jul. 28, 1988

[30] Foreign Application Priority Data

Jan. 22, 1987 [JP] Japan .................. 62-8003[U]

[51] Int. Cl.⁵ .................. F16H 45/02; F16D 3/50
[52] U.S. Cl. .................. 192/3.29; 192/106.2; 464/66
[58] Field of Search .................. 192/3.28, 3.29, 3.3, 192/30 V, 106.2; 464/66, 68

[56] References Cited

U.S. PATENT DOCUMENTS

| 4,143,561 | 3/1979 | Melhorn | 464/68 X |
| 4,406,355 | 9/1983 | Bionaz | 192/3.3 |
| 4,441,595 | 4/1984 | Lamarche | 192/3.29 |
| 4,484,898 | 11/1984 | Kohno | 464/64 |
| 4,572,339 | 2/1986 | Koshimo | 464/68 X |
| 4,646,886 | 3/1987 | Nishimura | 192/3.28 |
| 4,693,348 | 9/1987 | Tsukamoto et al. | 192/3.29 |
| 4,809,830 | 3/1989 | Schierling et al. | 192/3.29 |

FOREIGN PATENT DOCUMENTS

| 70662 | 1/1983 | European Pat. Off. | 192/3.28 |
| 55-132434 | 3/1979 | Japan . | |
| 57-51056 | 3/1982 | Japan . | |
| 58-22264 | 2/1983 | Japan . | |
| 58-106246 | 6/1983 | Japan . | |
| 59-139652 | 9/1984 | Japan . | |
| 59-222624 | 12/1984 | Japan . | |
| 61-180069 | 8/1986 | Japan | 192/3.3 |

Primary Examiner—Richard Lorence
Attorney, Agent, or Firm—Armstrong, Nikaido, Marmelstein, Kubovcik & Murray

[57] ABSTRACT

A lockup damper, in which an approximately disc-like piston (28) having a convex portion current toward a front cover (12) is provided freely slidingly in its axial direction. A retaining plate (38) and a side plate (40) for holding coil springs (36) are provided on the piston (28). Spring seats (44) and (50) compressing the coil springs (36) are formed on the retaining plate (38) and the side plate (40). A power transmitting driven plate (30) having axially projecting claws extending in between the coil springs (36) is provided. Therefore the lockup damper is simple in its construction, light in its weight, cheap in its manufacturing cost, and is suitable for a torque converter having the convex type front cover (12).

7 Claims, 6 Drawing Sheets

FIG.4a
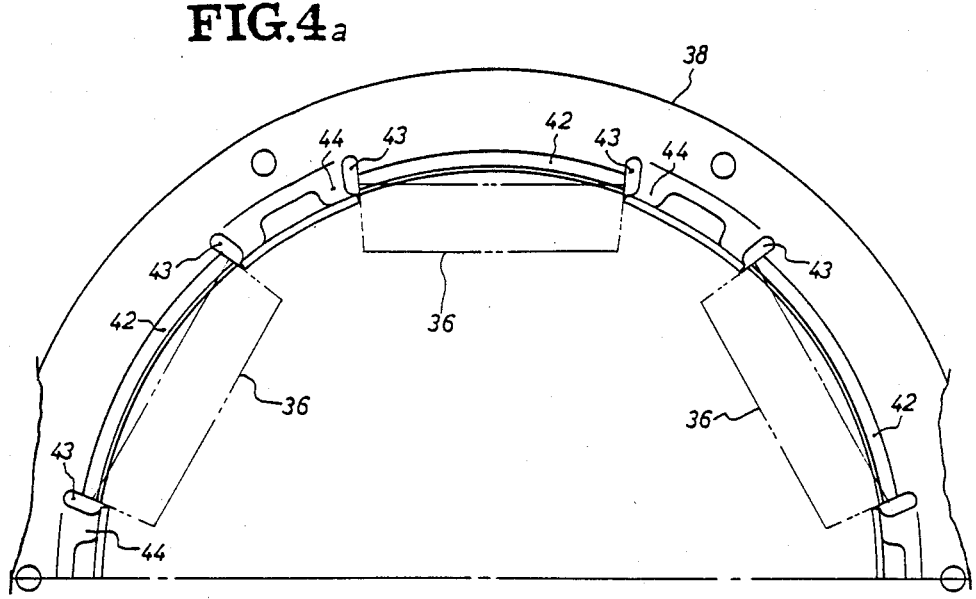
FIG.4
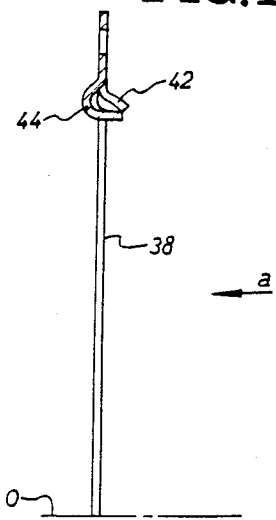

FIG.5a
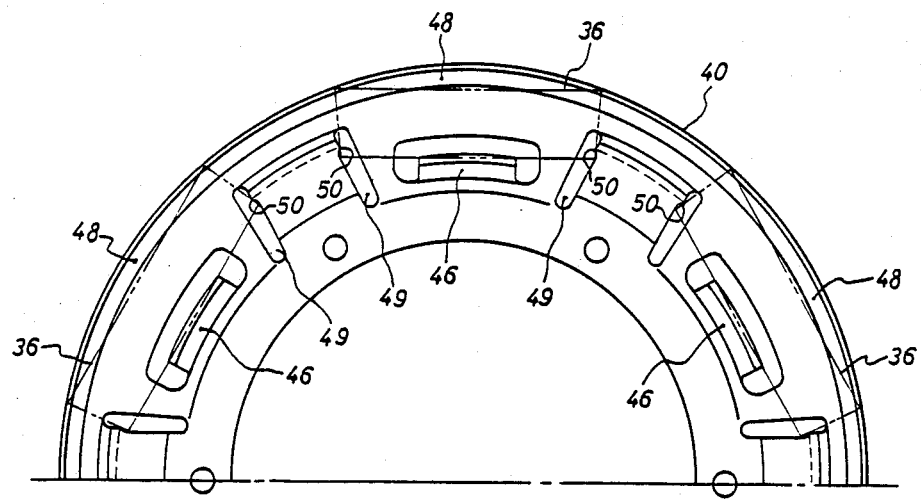
FIG.5
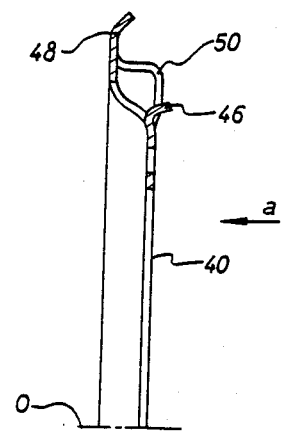

(PRIOR ART)

LOCKUP DAMPER FOR TORQUE CONVERTER

INDUSTRIAL USEFUL FIELD

This invention relates to a lockup damper for a torque converter having a so-called convex type cover installed between the front cover and a turbine to prevent torsional vibration generated by an engine from being transmitted to a transmission side when a lockup clutch for bringing the torque converter into a non-operating condition is engaged.

BACKGROUND ART

A so-called convex type torque converter, in which a radial intermediate part of a front cover is curved toward the outside for improving rigidity of the front cover and forming a space for housing the lockup damper, has conventionally been known (Published Patent Application (KOKAI) No. 59-222624, Published Utility Model Application (KOKAI) No. 59-139652 or Published Patent Application (KOKAI) No. 58-106246 corresponding to U.S. Pat. No. 4,484,898).

For convex type torque converter, two types have been known: a lug fitting type as illustrated in FIG. 8 and a spline fitting type as illustrated in FIG. 9.

However, because it is necessary to form lugs 100 (notches) on a most outer peripheral part of a piston and an outer peripheral part of a damper in the case of FIG. 8, its weight becomes heavy and it is difficulty to reduce cost.

Further, slap of the lug 100 is apt to arise, for example, during idling in the D-range.

Because two plates 101 of the damper are fastened together by rivets 102 the plate thickness can not be reduced and rigidity maintained. Thus, the cost is increased and the weight becomes heavy.

In the case of FIG. 9, it is necessary to form a spline internal tooth 104 on a damper hub 103 and to machine a spline external tooth also on a turbine hub in which the damper hub 103 fits, so that cost and increase in weight become inevitable.

SUMMARY OF THE INVENTION

An object of the invention is to provide a lockup damper for a torgue converter which is simple in construction, light in weight and inexpensive in cost, and is able to eliminate the foregoing conventional problems and at the same time is suitable for the torque converter having the convex type front cover.

Another features and advantages of the invention will become apparent from the following description with reference to the attached drawings.

STRUCTURE OF THE INVENTION (1) Technical measure

This invention provides a lockup damper for a torque converter having a convex type front cover curved toward an outside at its radial intermediate part of the front cover to which a power is transmitted; characterized by that an approximately annular disc-like piston, which is curved at its approximate radial intermediate part nearly along the front cover over the entire circumference, is freely slidable in an axial direction; a retaining plate, with holes for radial outside coil springs disposed at plural places on a circumference in said convex portion, is provided on an outer peripheral inside surface of the convex portion of the piston; a side plate, which holds the coil springs from a radial inside, is provided on an inner peripheral inside surface of the covex portion of the piston; spring seats compressing said coil springs are formed on any one or both of the retaining plate and the side plate; a power transmitting driven plate is provided which has claws extending in between the coil springs and is fastened at its inner peripheral part to a turbine hub.

(2) Function

The coil springs are disposed in the space in the convex portion of the piston and the coil springs are held by the thin retaining plate and the side plate, so that the low-cost and light-weight lockup damper becomes obtainable which can eliminate the slap and is suitable for the convex type front cover.

BRIEF DESCRIPTION OF THE DRAWINGS

FIG. 4 is a vertical sectional partial view of a retaining plate.

FIG. 4a is a view viewed in an arrow a of FIG. 4.

FIG. 5 is a vertial sectional view of a side plate.

FIG. 5a is a view viewed in an arrow a of FIG. 5.

BEST MODE FOR CARRYING OUT THE INVENTION

Figure 1:
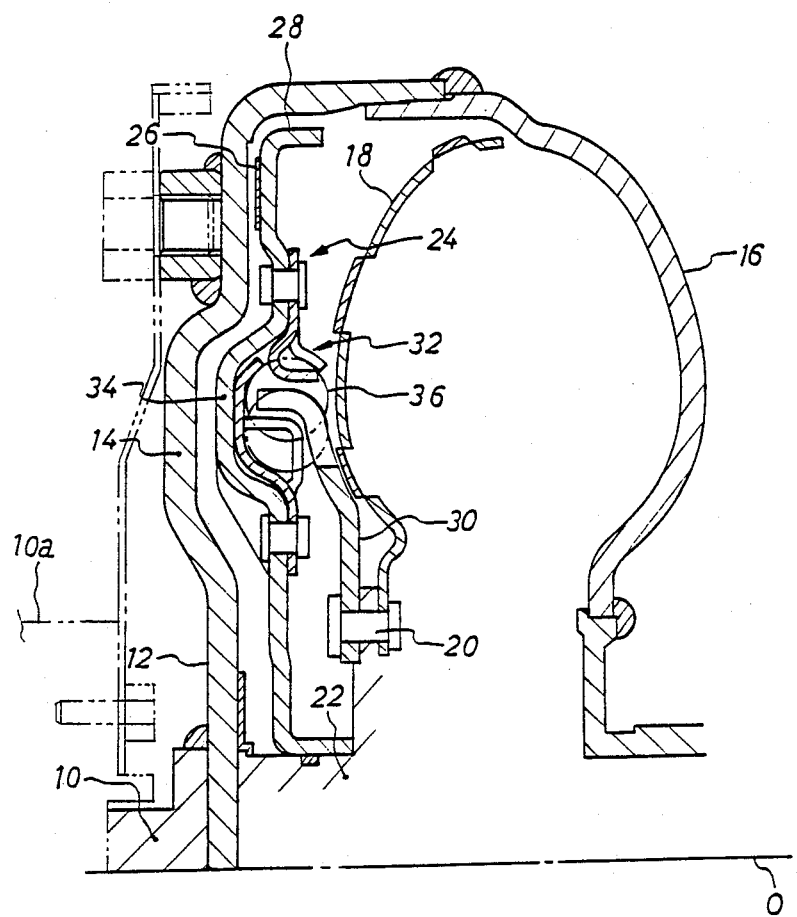
FIG. 1 is a schematic structural view of a torque converter according to the invention.

In FIG. 1 (shown from the upper part of center line 0), showing the automobile torque converter according to the invention, 10 is a front boss connected to a crank shaft rear end 10a of an engine. An approximately annular disc-like front cover 12 is welded to the front boss 10, and has an annularly consecutive convex portion 14 formed at a radial intermediate part of the front cover 12.

The front cover 12 is welded to a pump shell 16 at an outer peripheral part of the front cover 12, and a turbine 18 is provided so as to front on a pump having the pump shell 16. A well-known stator (not shown) is installed between the pump and the turbine 18. The turbine 18 is fastened by a rivet 20 to a turbine hub 22.

A lockup damper 24, which is an essential part of the invention, is installed between the front cover 12 and the pump shell 16 in such a manner as sliding freely in an axial direction on turbine hub 22. The lockup damper 24 is composed of a piston 28 having a friction facing 26 at its outer peripheral part, a driven plate 30 fastened to turbine 18 by rivet 20, and a damper mechanism 32 installed between the piston 28 and the driven plate 30.

Figure 2:
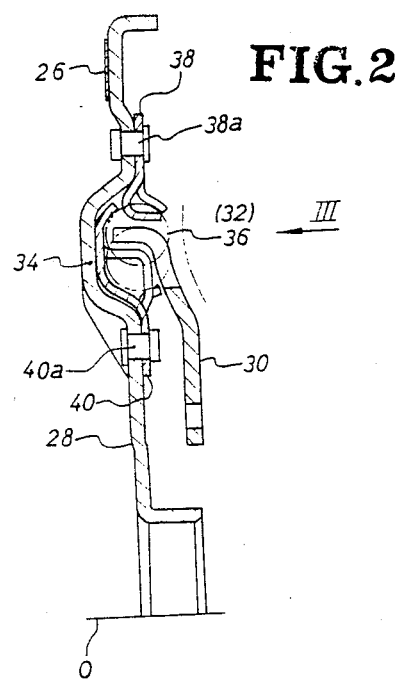
FIG. 2 is a vertical sectional partial view of a lockup damper.

As illustrated by FIGS. 1 and 2, a convex portion 34 curved toward the left side of the figure adjacent the convex portion 14 of the front cover 12 is formed at a radial intermediate part of the piston 28. Convex portion 34 is concentrically annular over the entire circumference. Coil springs 36, forming a part of said damper mechanism 32, are disposed annularly at six places with equal distances left therebetween in a circumferential direction. Coil springs 36 are held by retaining plate 38 and side plate 40 fastened to the piston 28 by rivets 38a and 40a, respectively.

As illustrated by FIG. 4a, the retaining plate 38 is formed into an annular disc-like shape, a supporting wall 42 (FIG. 4a) is formed on an inner peripheral edge positioned at a radial outside of the coil spring 36, and a spring seat 44 (FIG. 4a) on which an end face of the coil spring 36 presses is formed on an inner peripheral edge of the retaining plate 38 between adjoining coil springs 36. The supporting wall 42 and the spring seat 44 are cut and raised at a slit 43 formed by radially notching the inner peripheral edge of the retaining plate 38 as shown by FIG. 4.

Consequently, the coil spring 36 is positioned by the support wall 42 so that it can not move radially outward and toward the turbine 18 (FIG. 1).

Further, as illustrated by FIG. 5, supporting walls 46 and 48 and a spring seat 50 are formed on an outer peripheral part of the side plate 40. As illustrated in FIG. 5a, the supporting wall 46 located at a radial inside of the coil spring 36 positions the coil spring 36 so that the spring can not move toward the radial inside, and the supporting wall 48 positions the coil spring 36 so that it can not move toward the piston 28 (FIG. 1). The spring seat 50 is formed at a part between the adjoining coil springs 36, and the opposite end faces of the coil spring 36 are compressed by the spring seats 50.

The supporting wall 48 and the spring seat 50 are cut and raised at a slit 49 formed by notching a radial intermediate part of the side plate 40 as illustrated by FIG. 5a.

Figure 6A:
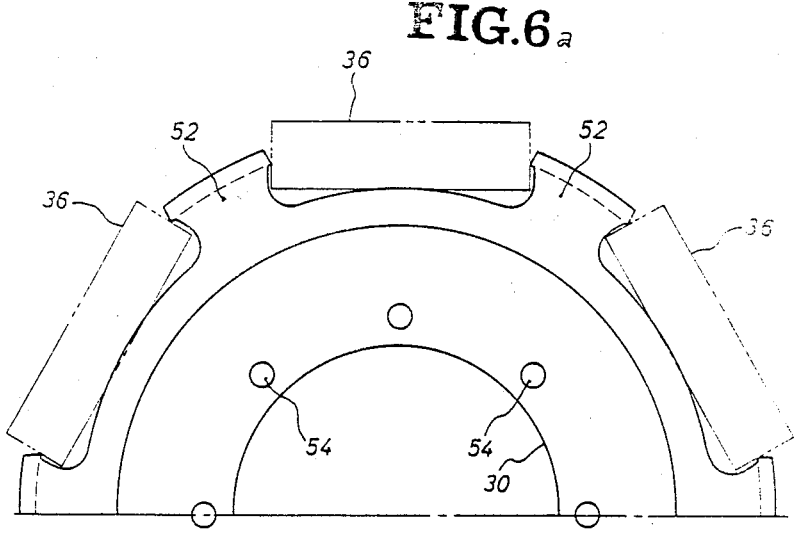
FIG. 6a is a view viewed in an arrow a of FIG. 6.
Figure 6:
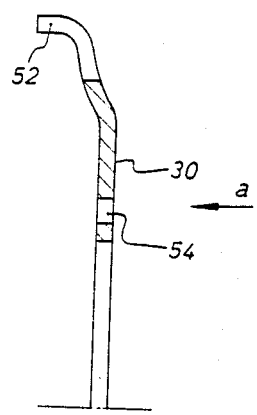
FIG. 6 is a vertical sectional partial view of a driven plate.
Figures 8, 9:
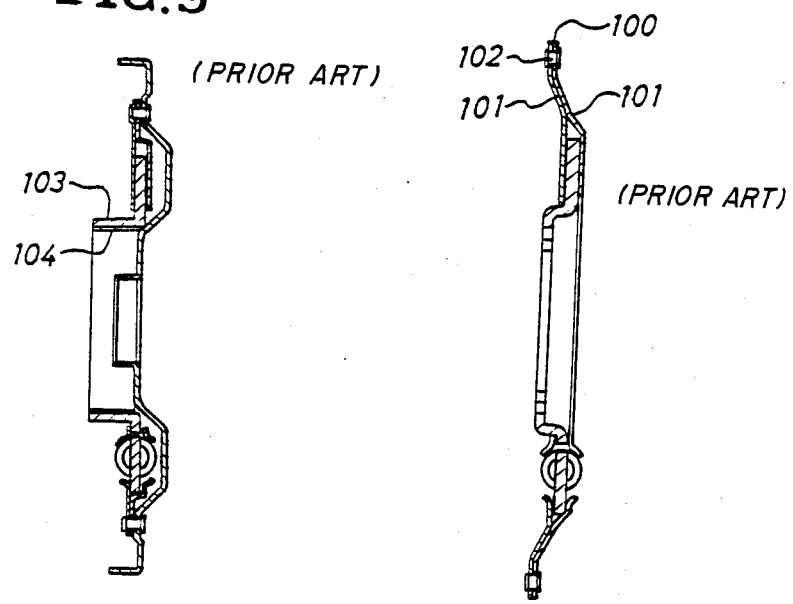
FIG. 8 and FIG. 9 are schematic vertical sectional views of conventional embodiments respectively.

Further, as illustrated by FIG. 6, the driven plate 30 is formed into an annular disc-like shape having axially projecting claws 52 at its outer peripheral part. The end faces of the claws 52 compress adjacent coil springs 36 so as to allow axial movement of the coil spring 36. Moveover, holes 54 are made on an inner peripheral part of the driven plate 30 so that the driven plate 30 is secured to the turbine 18 by rivets 20 passing through these holes 54.

As illustrated in FIG. 2, spring shoes 56 are installed on opposite faces of the coil spring 36. Spring seats 44, FIG. 4a and 50 FIG. 5a and the claws 52 FIG. 6a compress the coil spring 36 through the spring shoes 56 FIG. 2.

Accordingly, when assembling the lockup damper as described above, the retaining plate 38 and the side plate 40 are first secured to the piston 28, and then the coil springs 36 and the spring shoes 56 are fitted in between the spring seats 44 and the spring seats 50 in such a manner that they are pushed forward while being compressed (snap fitting).

Function will be described hereunder. In the foregoing lockup damper, the damper mechanism 32 composed of the coil spring 36, the retaining plate 38 and the side plate 40 etc. is disposed by utilizing the space in the inside of the convex portion 34 so that this lockup damper is suitable for the front cover 12 having the convex portion The retaining plate 38 and the side plate 40 are provided only at the places necessary for holding the coil springs 36 so that a material for use in the both plates, which is thinner than conventional one, will provide sufficient rigidity.

Because power from front cover 12 is transmitted from, piston 28 to the driven plate 30 through the coil spring 36 to the turbine hub 22 when the lockup action is effected, it is only necessary for the inner peripheral part of the piston 28 to slide in the axial direction relatively to the turbine hub 22. Therefore, the spline fitting becomes unnecessary and the number of machining process is reduced so that light-weight and low-cost can be accomplished.

Further, the claw 52 of the driven plate 30 compressively contacts with the spring shoe 56 through the coil spring 36 so that there is no possibility of generation of the conventional slap.

Correction of unbalance after assembly becomes possible by replacing the spring shoe 56 with other one having a different weight. Such correction of unbalance is described in details in the Published Utility Model Application No. 61-179549 applied by the applicant of the present invention.

EFFECT OF THE INVENTION

As described above, in the lockup damper 24 of the torque converter according to the invention; the approximately annular disc-like piston 28, which is convex curved its radial intermediate part nearly along the front cover 12 over the entire circumference, is provided freely slidingly in the axial direction; the retaining plate 38, which holds from the radial outside the coil springs 36 at plural places on the circumference in the convex portion, is provided on the outer peripheral inside surface of the convex portion 34 of the piston 28; the side plate 40, which holds the coil springs 36 from the radial inside, is provided on the inner peripheral inside surface of the convex portion 34 of the piston 28; spring seats 44 and 50 compressing the coil springs 36 are formed on any one or both of the retaining plate 38 and the side plate 40; the power transmitting driven plate 30 is provided which has claws 52 extending in between the coil springs 36 and is fastened at its inner peripheral part to the turbine hub 22. Therefore, the lockup damper according to the invention has the following advantages.

The damper mechanism 32, composed of the coil spring 36, the retaining plate 38 and the side plate 40 etc., is disposed by utilizing the space in the inside of the convex portion 34 so that the lockup damper suitable for the front cover 12 having the convex portion 14 can be materialized.

The retaining plate 38 and the side plate 40 are provided only at the places necessary for holding the coil springs 36 so that the material for use in the both plates, which is thinner than in conventional plates, gives a sufficient rigidity and realize a light-weight structure.

Because the power of the front cover 12 is transmitted from the driven plate 30 through the coil spring 36 to the turbine hub 22 when the lockup action is effected, it is only necessary for the inner peripheral part of the piston to slide in the axial direction relatively to the turbine hub 22. Therefore, the spline fitting becomes unnecessary and the number of machining process is reduced so that light-weight and low-cost can be accomplished.

Further, it becomes unnecessary to form lug fitting part on the outer peripheral part of the piston 28. The number of machining process can be reduced, and light-weight and low-cost can be accomplished in the same manner.

ANOTHER EMBODIMENT (1) The lockup damper according to the present invention is applicable not only to the torque converter for automobile but to general fluid couplings.

Figure 3:
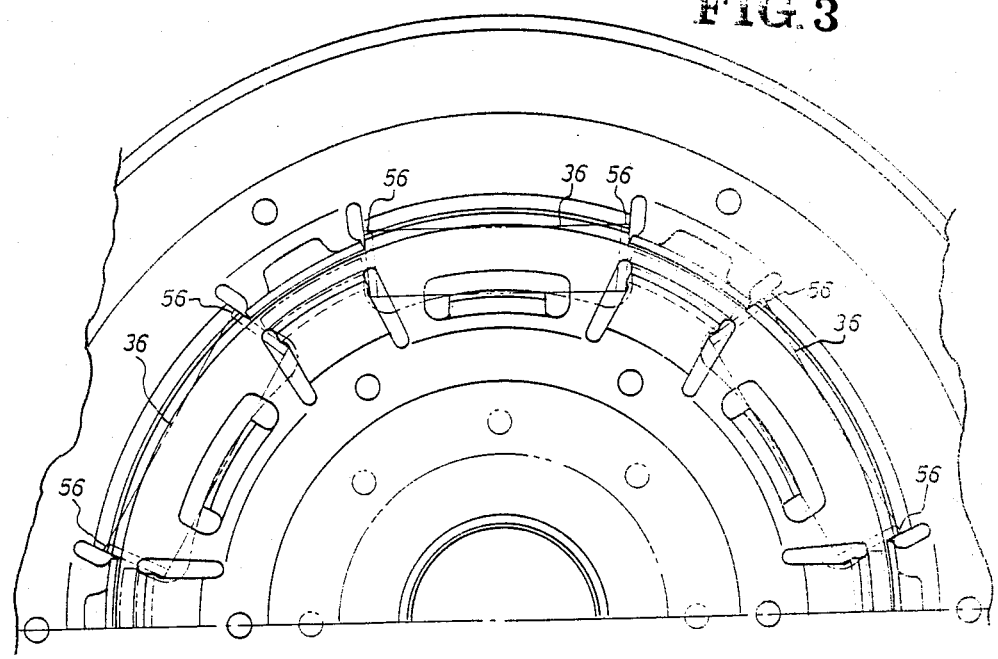
FIG. 3 is a view viewed in an arrow III of FIG. 2.

(2) In the lockup dampers of FIG. 2 and FIG. 3, the single-stage type coil spring 36 is used. However, a double-stage type or triple-stage type coil spring may be formed by making clearances between the spring seats 44 & 50 and the spring shoes 56 or by using a double coil spring in which the coil spring 36 serves as its external spring and its internal spring is made shorter than the external spring.

Figure 7:
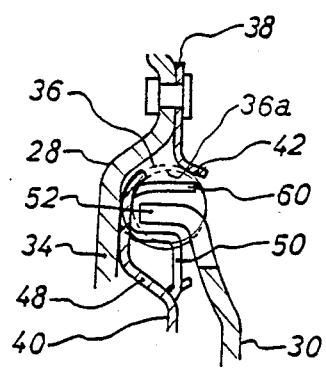
FIG. 7 is a vertical sectional partial view of another embodiment.

(3) Further, the spring seat compressively contacting with the end face of the coil spring 36 is not limited to the structure of being provided on both the retaining plate 38 side and the side plate 40 side, but it may be changed, for example, to such a structure that only the supporting wall 42 is formed on the retaining plate 38 secured to the outer peripheral part of the convex portion 34 and the spring seat 50 of the side plate 40 secured to the inner peripheral part of the convex portion 34 is extended to form an integral spring seat 60 as illustrated by FIG. 7. In this case, the spring shoe and a left end 36a (viewing in a direction of FIG. 3) of the coil spring 36 are installed in such a manner that they contact with the side plate 40 and not with the piston 28.

It is also possible to form only the supporting wall on the inner peripheral side plate 40 and to form two spring shoes on the outer peripheral side retaining plate 38.

What is claimed is:

1. A lockup damper for a torque converter, said torque converter having a front cover with a convex portion curved toward an outside at its radially intermediate part and to which power is transmitted, a turbine and a turbine hub fixed to said turbine; said lockup damper comprising an approximately annular disc-like piston having a convex portion curved toward said front cover at its radially intermediate part adjacent said convex portion of the front cover, said piston being mounted on said turbine hub freely slidable in an axial direction relative to said front cover; a plurality of coil springs disposed circumferentially in said convex portion of said piston; an annular retaining plate for holding said coil springs from moving radially outward secured to said piston radially outward of said convex portion of said piston; a side plate for holding said coil springs from moving radially inward secured to said piston radially inward of said convex portion of said piston; spring seats for compressing coil springs formed on any one or both of said retaining plate and said side plate; and a power transmitting driven plate fastened at its inner peripheral part to said turbine and having axially projecting claws extending toward said convex portion of said piston between adjacent ones of said coil springs.

2. A lockup damper for a torque converter as set forth in claim 1, in which a supporting wall for supporting said coil springs is formed on an inner peripheral edge of said retaining plate and positioned radially outside of said coil springs, spring seats are formed on an inner peripheral edge of said retaining plate and positioned between adjacent coil springs, and said supporting wall and said spring seats are formed by means of a cutting and raising work at a slit on the inner peripheral edge of said retaining plate.

3. A lockup damper for a torque converter as set forth in claim 1, in which a supporting wall and spring seats for supporting said coil springs are formed by means of a cutting and raising work at slits formed at a radial intermediate part of said said plate.

4. A lockup damper for a torque converter as set forth in claim 1, in which said claws are formed on an outer peripheral part of said driven plate in such a manner that said claws extend between adjacent ones of said coil springs and said coil springs are compressed by opposite end faces of said claws.

5. A lockup damper for a torque converter as set forth in claim 1, in which spring shoes are installed on opposite end faces of said coil springs.

6. A lockup damper spring for a torque converter as set forth in claim 1, in which a supporting wall for supporting said coil springs is formed on said retaining plate and positioned radially outside of said coil springs, and spring seats compressively contacting said coil springs are formed on said side plate.

7. A lockup damper for a torque converter, said torque converter having a front cover with a convex portion curved toward an outside at its radially intermediate part and to which power is transmitted, a turbine and a turbine hub secured to said turbine; said lockup damper comprising an approximately annular disc-like piston, having a convex portion curved toward said cover at its radially intermediate portion adjacent said convex portion of said front cover, said piston being mounted freely slidable in an axial direction on said turbine hub; a plurality of coil springs disposed circumferentially in said convexly curved intermediate portion of said disc-like piston; and annular retaining plate for holding said coil springs from moving radially outward secured to said piston radially outward of said convex portion of said piston; a side plate for holding said coil springs from moving radially inward secured to said piston radially inward of said convex portion of said piston; spring seats compressing said coil springs formed on said retaining plate and said side plate; a power transmitting driven plate, having axially projecting claws extending toward said convex portion of said piston between adjacent ones of said coil springs and compressively contacting said coil springs means for securing said driven plate at its inner periphery on said turbine hub; a supporting wall for supporting said coil springs formed on an inner peripheral edge of said retaining plate and positioned radially outside of said coil spring; spring seats formed on an inner peripheral edge of said retaining plate and positioned between adjacent ones of said coil springs; said supporting wall and said spring seats being formed by cutting and raising work at a slit of the inner peripheral edge of said retaining plate; and spring shoes installed on opposite end faces of said coil springs.

* * * * *